United States Patent

[11] 3,540,678

| [72] | Inventors | Eveline Gottzein<br>Oberpframmern;<br>Norbert Klamka, Ottobrunn; Helmut<br>Bittner, Munich; Hermann Schwake,<br>Neubiberg, Germany |
|---|---|---|
| [21] | Appl. No. | 662,435 |
| [22] | Filed | Aug. 22, 1967 |
| [45] | Patented | Nov. 17, 1970 |
| [73] | Assignee | Bolkow GmbH<br>Ottobrunn near Munich, Germany |
| [32] | Priority | Aug. 24, 1966 |
| [33] | | Germany |
| [31] | | No. B88601 |

[54] METHOD OF AND APPARATUS FOR CONTROLLING THE TRANSVERSE ACCELERATION AND ROLL DAMPING OF STEERABLE AERODYNAMIC BODIES
5 Claims, 5 Drawing Figs.

| [52] | U.S. Cl. | 244/3.2 |
|---|---|---|
| [51] | Int. Cl. | F41g 7/00 |
| [50] | Field of Search | 244/3.15, 3.2, 3.21, 3.22, 77(G); 235/150.25 |

[56] References Cited
UNITED STATES PATENTS

| 2,873,074 | 2/1959 | Harris et al. | 244/3.21 |
| 3,007,656 | 11/1961 | Miller et al. | 244/77(G) |
| 3,278,139 | 10/1966 | Borcher et al. | 244/3.22 |
| 3,374,966 | 3/1968 | Howard | 244/3.2 |

*Primary Examiner*—Verlin R. Pendegrass
*Attorney*—McGlew and Toren

ABSTRACT: Control of the transverse acceleration about the pitch axis and the yaw axis of a dirigible missile is effected solely by linear accelerometers, which also control roll damping about the roll axis. The roll axis is stabilized by a displacement gyroscope. The accelerometers are arranged on the Y and Z axes of a Cartesian system of coordinates of which the X axis is the roll axis. The accelerometers are arranged in either one diametric plane, which also includes the displacement gyroscope, or are arranged in two diametric planes spaced on respective opposite sides of the center of gravity of the missile. All the accelerometers are at the same radial distance from the X axis and, in each diametric plane, the accelerometers are arranged at an angular spacing of 90°. The signals from the accelerometers are combined in a network to provide control signals for actuators for adjusting two pairs of steering rudders.

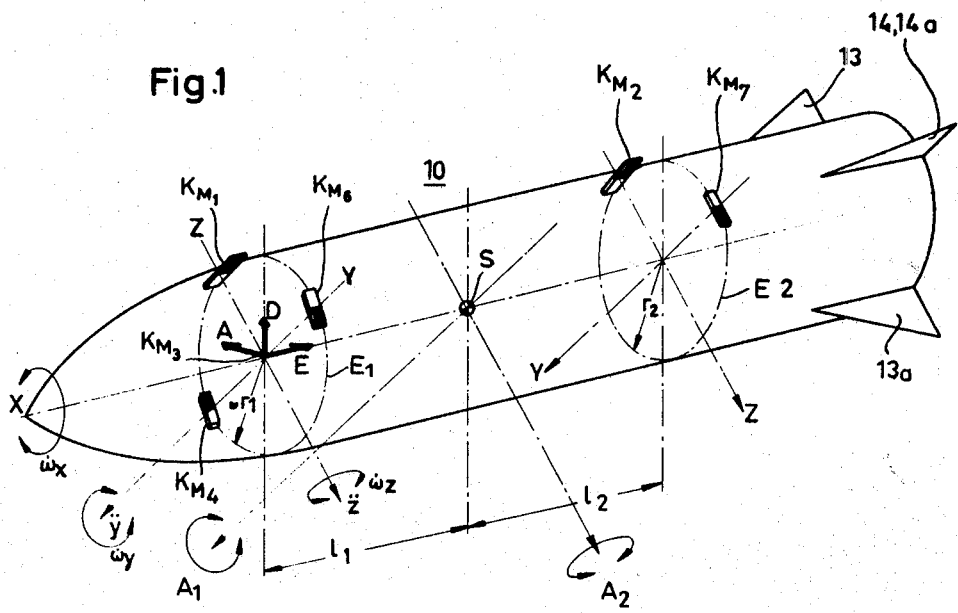

3,540,678

METHOD OF AND APPARATUS FOR CONTROLLING THE TRANSVERSE ACCELERATION AND ROLL DAMPING OF STEERABLE AERODYNAMIC BODIES

BACKGROUND OF THE INVENTION

In order to be able to steer a self-propelled aerodynamic body, it is necessary to have, in addition to control means which effect a predetermined curvature of the trajectory of the center of gravity of the body, such as rudders or control jets, a stabilization device which produces, through logical actuation of the rudders, moments about axes fixed with respect to the aerodynamic body and in such a manner that, upon occurrence of interference moments thereon, the aerodynamic body always resumes its normal attitude automatically. The stabilization device thus acts as an internal control loop which maintains the angle of attack of the aerodynamic body constant. The angle of attack is changed only responsive to steering commands arriving at the body. For this purpose, an external control loop, or a so-called "steering control loop" is provided in addition to the internal control loop.

In the case of aircraft, control of the attitude during flight is effected by means of autopilots using, as a sensing device, a gyrostabilized platform carrying displacement and rate gyroscopes. However, autopilots or automatic pilots are not usable for unmanned aerodynamic bodies, as such bodies are so-called "expendable" equipment which is lost after the first use and therefore cannot be equipped with high precision and very expensive sensing devices. As the largest possible payload, with respect to a predetermined propulsion power, must be delivered, all auxiliary equipment, among which are also counted measuring and control devices, must be designed as lightweight and space-saving as possible. More importantly, however, aerodynamic bodies are subjected to substantially higher acceleration than is common in aircraft, for instance 10g. to 15g. as compared to 0.8g. for aircraft.

Consequently, angular velocity control, rather than position control, is generally used for aerodynamic bodies. Any angular velocities occurring are measured by rate gyroscopes. In order to change the trajectory of such an aerodynamic body, by a change of the reference input, angular velocity commands must be generated and these are transformed into lateral acceleration through positioning members acting on rudder surfaces. The lateral acceleration therefore is controlled indirectly through the angular velocity of the aerodynamic body, and this leads to a relatively slow building up of the lateral acceleration. The aerodynamic body therefore has relatively large inertia, so that the steering control loop is also affected as to its speed of response. Thus, a sluggish aerodynamic body introduces its inertia into the steering control loop as a delay, and as a result is harder to stabilize and, even if optimized, has a relatively great control lag.

Furthermore, and considering the required high sensitivity of response, rate gyroscopes can be designed for only a narrowly limited range of measurement. For aerodynamic bodies which should be controllable over a large range of mach numbers with the least possible change in control behavior, the use of rate gyros results in further problems. Because of the fixed measuring ranges of the latter, the individual control parameters must be changed in accordance with the flight conditions prevailing in each case.

In the arrangement described in German Auslegeschrift No. 1,089,449, this is accomplished, for example, by making the feedback loop of the external control loop adjustable, in order to adjust the loop gain as a function of the characteristic frequency of the aerodynamic body so that sufficient stability of the control loop is assured in the prevailing flight condition. Additionally, the lateral acceleration of the aerodynamic body is measured by a lateral accelerometer arranged in the feedback circuit, and the output thereof is superimposed as a damping signal into the external control loop.

Another example of a gain control using a lateral accelerometer is shown in U.S. Pat. No. 3,154,266, disclosing a control arrangement for a beam-guided aerodynamic body. The output signal of the accelerometer is fed to a position servomotor through a partial integrator, and is used for gain control in order to obtain the same rudder effectiveness irrespective of changes in velocity, weight and center of gravity of the aerodynamic body.

In all these arrangements, the accelerometers are supplementary devices and must be located as accurately as possible at the center of gravity of the aerodynamic body, in order to avoid errors in the control signals due to pitch and yaw motion of the body. While the accelerometer signals are also effective in the internal control loops for the stabilization of the aerodynamic bodies, they do not serve for stabilization but for damping of the steering control loops of the bodies, especially for changing the control parameters in accordance with the prevailing or existing flight conditions.

Control systems for aerodynamic bodies, designed as rate controls, and in which certain control parameters must be changed by means of servosystems during flight, because of the fixed range of measurement of the rate gyroscopes, are not only expensive but are also the source of many troubles.

In aerodynamic bodies having aerodynamic pairs of rudders arranged in cross formation, one rudder pair, as is known to those skilled in the art, is influenced simultaneously by, for example, the pitch and the roll control loops. Thus, linear positioning elements which make possible linear superposition of positioning signals from two or more control loops are required for the pairs of rudders. This results in a further problem, which is that of the so-called "crosstalk" between the control loops for the pitch and yaw axes and which control loops can be influenced by the steering commands. (See, for example, "Kinematic Coupling of Control Loops", Luftfahrttechnik-Raumfahrttechnik 11, 1965, p. 100—103).

Disturbances about the roll axis, arising from the pitch and/or yaw moments, for which a control loop has to compensate deviations from the desired position caused by external interference moments, must therefore be balanced out as rapidly as possible in order to keep the permanent roll deviation as small as possible. With larger lateral accelerations, this, also, cannot be accomplished satisfactorily by a displacement gyroscope combined with rate gyroscopes. Thus, because of the large measuring range of the rate gyroscope required, and the high accuracy required, the position signal cannot be obtained by integration of the rate gyroscope signal, as large measuring ranges cause large null errors which, due to the complete integration as a function of time, lead to rapidly increasing roll position errors. Additionally, the available measuring range of presently known rate gyroscopes limits the magnitude of the angular velocity which can be negotiated by an aerodynamic body, so that its maneuverability is far below the limitations set by the applicable aerodynamics, the air frame, and the propulsion motor or motors of the body.

Australian Pat. No. 214,941 discloses an autopilot system for the control of an aircraft in which, in addition to a gyrostabilized platform, accelerometers arranged in pairs are provided. The angular accelerations measured by the accelerometers are fed, after exact integration, to the autopilot as additional control signals to compensate trajectory disturbances of short duration caused, for example, by gusts of wind or by turbulence. In this arrangement also the position control, which also compensates, for example, possible null errors of the accelerometers, is essentially effected by the autopilot, that is, through gyroscopes. Only additional short term control events are influenced by the accelerometers, and this influence is only with respect to damping. It is the purpose of the arrangement of the Australian patent to avoid differentiation of deviations commonly measured by displacement gyroscopes, and which leads to an undesirable rise in the noise level of the control loop. Consequently, the arrangement uses integrated accelerometer signals.

Also, in the system of the Australian patent, the measuring ranges occurring are very small due to the small permissible transverse accelerations, for example, 1g. to 2g. maximum. The null errors of the accelerometers can therefore be kept very small. The arrangement is for an aircraft having a relatively long life, so that a large expenditure for measuring gear, such as gyrostabilized platforms, high precision accelerometers, and precise integrators, are justifiable.

SUMMARY OF THE INVENTION

The invention relates to the control of the lateral acceleration and roll damping of steerable or dirigible aerodynamic bodies propelled by a rocket engine and stabilized about their roll axes by means of a displacement gyroscope. More particularly, the invention is directed to an improved method of and apparatus for such control and involving the use of sets of accelerometers for providing signals responsive to variations in the attitude of the body, such as caused by yawing and pitching thereof, and in which the outputs of the accelerometers are combined with each other and with the output of the displacement gyroscope to provide control signals for actuator means operating steering rudders of the aerodynamic body.

The invention is based upon the premise that a control loop with on–off action exhibits an optimum control behavior with regard to system parameters if the control signals are suitably provided. The invention solves the problem by providing the control signals, required for control about the pitch and yaw axes of a dirigible, reaction propelled aerodynamic body stabilized about its roll axis by means of a displacement gyro, as well as for roll damping, exclusively from accelerometer signals. For this purpose, five accelerometers preferably are provided, and are arranged in diametric or transverse planes spaced definite distances either side of the center of gravity of the aerodynamic body.

As contrasted to the aforementioned Australian Pat. No. 214,841, in the invention arrangement control of the lateral acceleration is effected using only accelerometer signals. With an aerodynamic body having rudders arranged in the form of a cross, and a Cartesian reference system, the angular accelerations about the pitch axis are always added to the lateral accelerations of the yaw axis, and the angular accelerations about the yaw axis are always added to the lateral accelerations of the pitch axis. The control coefficients provided by the aerodynamic body system are superimposed upon the thus combined accelerometer signals, and the combined signals are then fed back as feedback signals to the controls associated with the pitch and yaw axes which feed the determined error signals to actuating members having on–off characteristics and to which are additionally fed, directly through filters for the purpose of damping, the existing angular accelerations about the pitch and yaw axes. The control error in the control loop for the yaw axis is fed as an additional positioning signal to the control loop for the roll axis, and the control error in the control loop for the pitch axis is fed as an additional positioning signal to the control loop for the yaw axis.

One form of apparatus embodying the invention comprises five accelerometers, with the output signal of one accelerometer also serving for damping of the roll position control in a manner known per se. The accelerometers are arranged in transverse or diametric planes provided at predetermined distances on either side of the center of gravity of the aerodynamic body, and the accelerometers are arranged on mutually perpendicular axes which lie in planes including the rudder surfaces. Networks are provided for processing the sensor signals to obtain the control quantities from the accelerometer signals, and filters, adders and inverters are provided for the formation of feedback signals. The processing networks take into account system-based coefficients, damping signals and controls to determine the control errors and appropriately operate actuating elements of the on–off type.

By this arrangement, a nonlinear control system of very low parameter sensitivity is obtained so that the system behavior changes only insignificantly over a large range of mach numbers, i.e., over a large range of variation of aerodynamic coefficients. The lateral accelerations, due to the absence of rate gyroscopes, may have for the first time magnitudes of as high as 50g. These lateral accelerations are entered into the control system directly as commands, and they can be built up rapidly by the aerodynamic bodies so that, for the first time, there can be realized an external control loop which has nearly optimum performance. This is a great advantage for aerodynamic bodies of high velocity and which are steerable by any known method, particularly such bodies which are especially usable for defense against low-flying aircraft. Furthermore, the behavior of the control can be varied to an extent not hitherto-fore possible, in view of the acceleration values available as control signals, and the control can be optimized to a better extent, for the purpose mentioned, than is possible using angular velocity signals as control quantities. Above all, however, the effects of vibration of aerodynamic body and of friction and unbalance moments on acceleration can be eliminated much better than hitherto possible.

Although the control quantities are obtained through super-position of the signals of several measuring elements, or accelerometers, it is possible to minimize, through suitable choice of the system-based coefficients, the influence of the null errors of the accelerometers. Due to the fed-back damping signals and the suitably selected system-based coefficients, the null errors of the individual accelerometers do not add with respect to their effect on the feedback signals. The feedback quantities are therefore affected only by the null error of only one of the measuring elements. Therefore, the control system makes possible the use of relatively inexpensive accelerometers, which results in considerable savings in view of their use as expendable equipment. Finally, transfer functions for the feedback of angular accelerations can be combined in the pitch and yaw control loops as will be shown in detail hereinafter.

In another form of apparatus embodying the invention, only three accelerometers are provided and are arranged in a single transverse or diametric plane provided at a predetermined distance from the center of gravity of the aerodynamic body. The displacement gyroscope, serving for the control of the roll position, is also located in this plane, and its output signals are transformed into control signals which represent a combination of rotary and lateral acceleration. The control signals are again processed, through filters, adders and inverters, into feedback quantities taking into consideration the system-based coefficients, and the final control signals are fed to controls which cooperate with on–off type actuator elements for the rudder surfaces of the aerodynamic body.

Accordingly, an object of the present invention is to provide an improved method of and apparatus for controlling the lateral acceleration and roll damping of steerable aerodynamic bodies propelled by a rocket engine and stabilized about their roll axes by displacement gyroscopes.

Another object of the invention is to provide such a method and apparatus using only accelerometers for effecting control of the lateral acceleration and roll damping.

A further object of the invention is to provide such a method and apparatus for control of the lateral acceleration about the pitch and yaw axes, and the roll damping of steerable aerodynamic bodies which are position stabilized about their roll axis and which does not require the use of rate gyroscopes.

Still another object of the invention is to provide such a method and apparatus permitting very large accelerations and therefore maneuverability over a wide mach range, much beyond that possible with present equipment, and without requiring special arrangements for the setting of control parameters of any kind.

A further object of the invention is to provide such a method and apparatus utilizing five accelerometers arranged in transverse or diametric planes of the body at predetermined distances from the center of gravity of the body.

Still another object of the invention is to provide such a method and apparatus in which the control is provided by three accelerometers arranged in a transverse or diametric plane provided at a predetermined distance from the center of gravity of the aerodynamic body, the plane also having located therein a displacement gyroscope serving for control of the roll position.

A further object of the invention is to provide such a method and apparatus in which sensor signals, corresponding to the control quantities from the accelerometer signals, are processed in networks including filters, adders and invertors for the formation of feedback signals and taking into account system-based coefficients, damping signals and controls to determine the control errors and appropriately operate actuator elements of the on–off type.

BRIEF DESCRIPTION OF THE DRAWINGS

For an understanding of the principles of the invention, reference is made to the following description of typical embodiments thereof as illustrated in the accompanying drawings.

In the Drawings:

FIG. 1 is a somewhat schematic view of an aerodynamic body illustrating the arrangement of the measuring sensors therein;

DESCRIPTION OF THE PREFERRED EMBODIMENTS

Figure 3A:
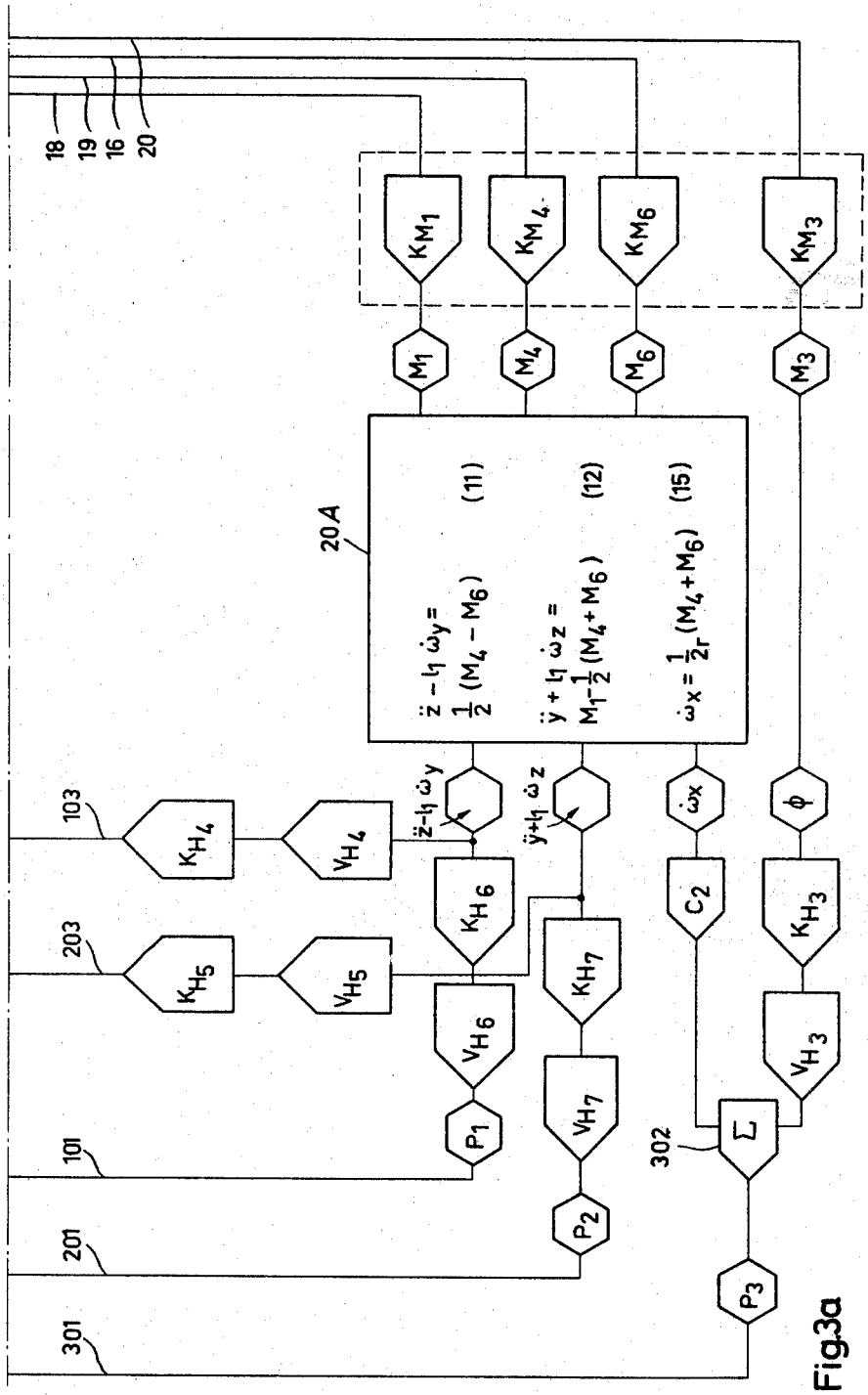
FIGS. 3a and 3b are, conjointly, a block diagram of apparatus embodying the invention and utilizing three accelerometers.

Referring to FIG. 1, a Cartesian coordinate system is illustrated as having an X axis extending in the direction of flight of the schematically illustrated aerodynamic body 10, and a Y axis and a Z axis. The Y axis and the Z axis are inclined downwardly, being perpendicular to the X axis and perpendicular to each other. The Y axis lies in the plane of the rudder surfaces 14, 14a, and the Z axis lies in the plane of the rudder surfaces 13, 13a. The lifting surfaces of the aerodynamic body have been omitted to simplify the illustration.

At a distance $l_1$ from the center of gravity S of the aerodynamic body there is arranged a plane $E_1$ in which are positioned accelerometers $K_{M1}$, $K_{M4}$ and $K_{M6}$ which serve as data transmitters as well as the displacement gyroscope $K_{M3}$. In a second plane $E_2$ at a distance $l_2$ from the center of gravity S, there are arranged accelerometers $K_{M2}$ and $K_{M7}$. The accelerometers, which, by way of example, may be of the type shown in FIG. 17.34 on page 17—38 of "Control Engineers' Handbook" by John G. Truxel, Published in 1958 by McGraw Hill, are so positioned that they are always located in planes defined by the axes XY and YZ. The displacement gyroscope $K_{M3}$ is arranged, as illustrated in FIG. 1, with its center of gravity on the X axis of the aerodynamic body and as having an input axis E, an output axis A, and a spin axis D. Accelerometers $K_{M1}$, $K_{M4}$ and $K_{M6}$ are arranged at the radial distance $r_1$ from the X axis, and accelerometers $K_{M2}$ and $K_{M7}$ are arranged at the radial distance $r_2$ from the X axis.

The angular accelerations about the X, Y and Z axes are designated, respectively, $\dot{\omega}_x$, $\dot{\omega}_y$ and $\dot{\omega}_z$.

The lateral accelerations in the Y and Z directions are designated, respectively, $\ddot{y}$ and $\ddot{z}$. Assuming an aerodynamic body in which the angular roll velocity remains small and terms of higher order of the rotational velocities can therefore be neglected, the following measured data are obtained at the accelerometers for motion of the aerodynamic body shown in FIG. 1 about the center of gravity S:

$$M_1 = l_1\dot{\omega}_z + \ddot{y} + r_1\dot{\omega}_x \quad (1)$$

$$M_2 = -l_2\dot{\omega}_z + \ddot{y} + r_2\dot{\omega}_x \quad (2)$$

$$M_4 = -l_1\dot{\omega}_y + \ddot{z} + r_1\dot{\omega}_x \quad (3)$$

$$M_6 = l_1\dot{\omega}_y - \ddot{z} + r_1\dot{\omega}_x \quad (4)$$

$$M_7 = -l_2\dot{\omega}_y - \ddot{z} + r_2\dot{\omega}_x \quad (5)$$

These are the input quantities for the control now to be described.

Figure 3B:
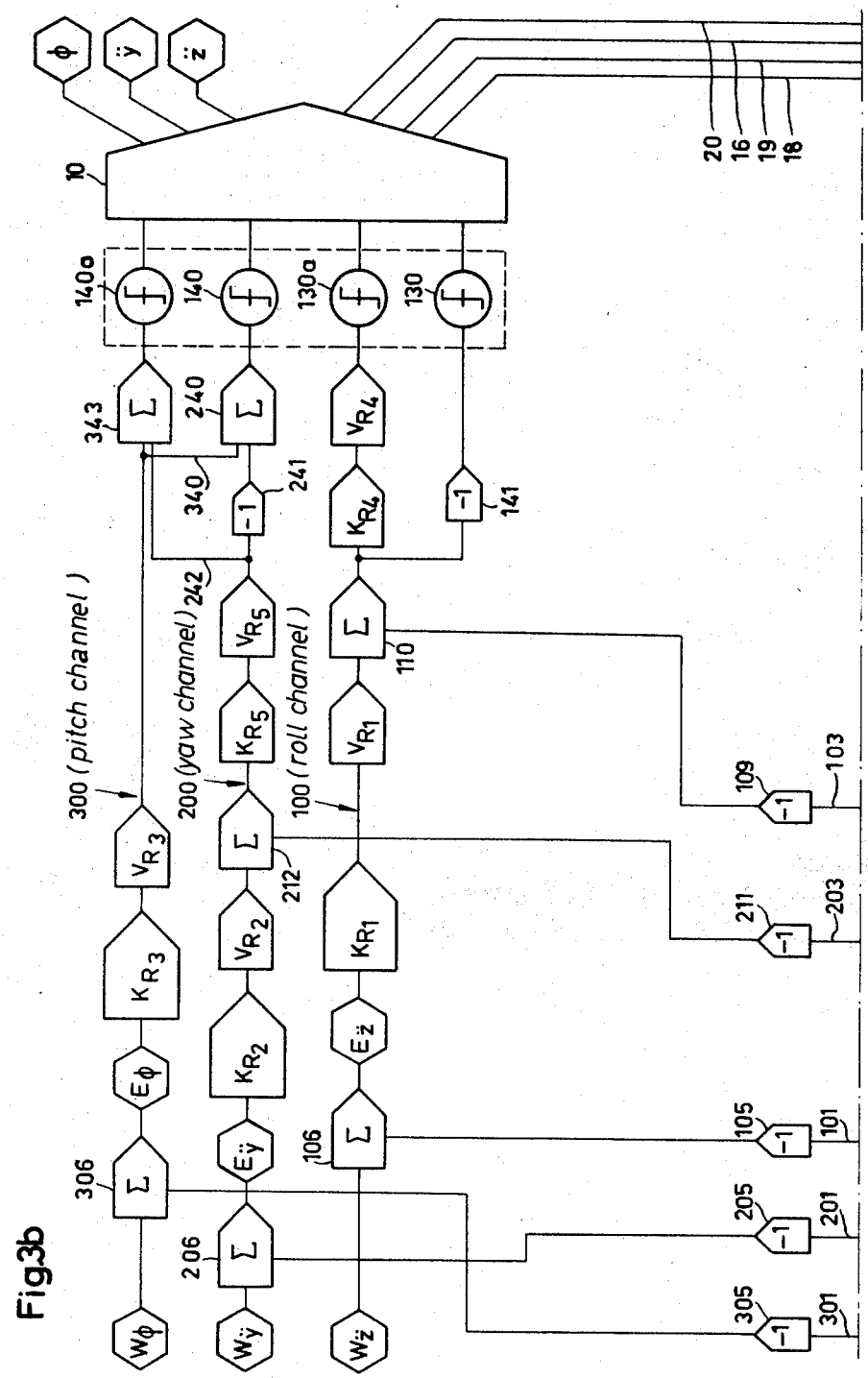
Figure 2A:
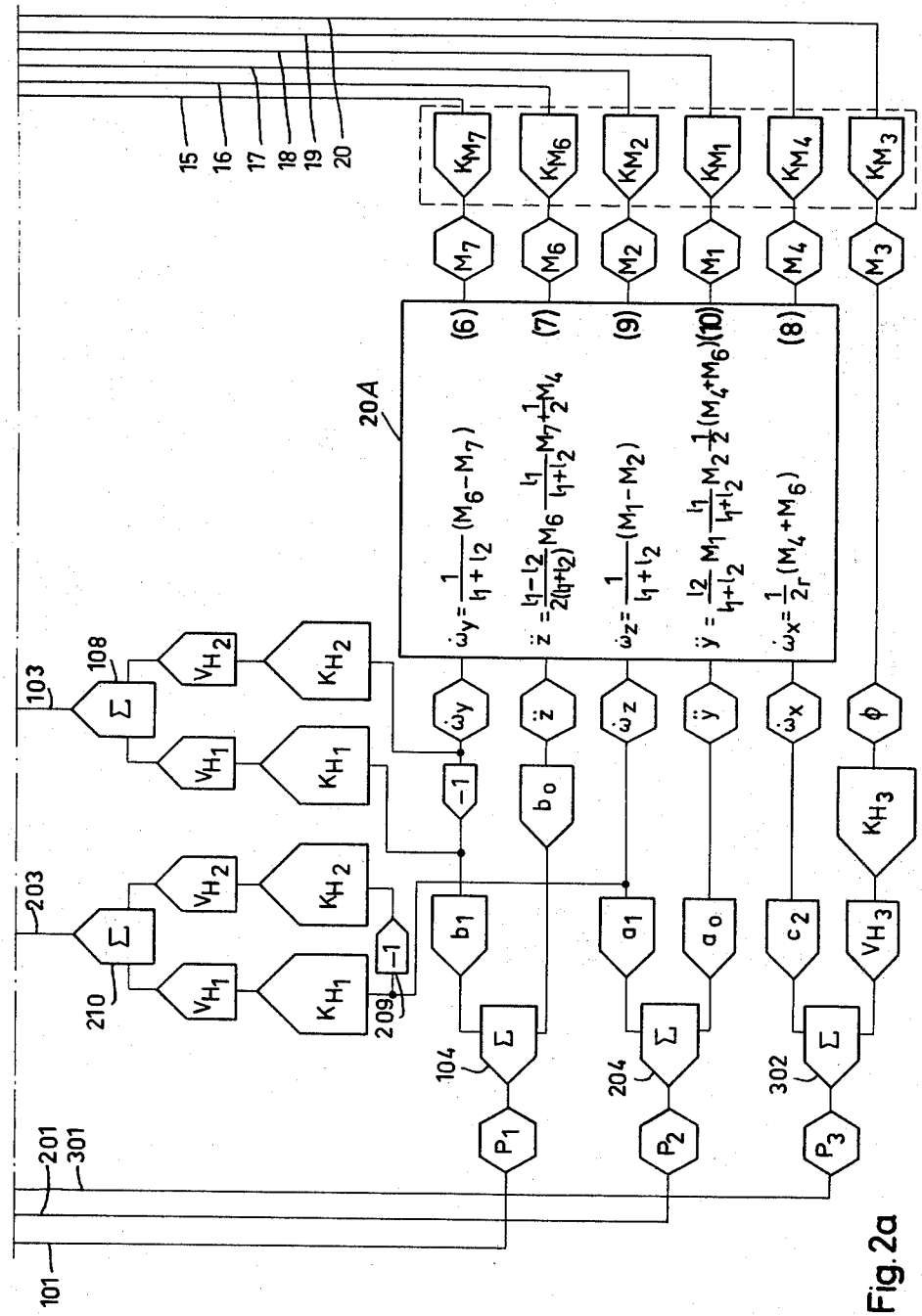
FIG. 2a and 2b are, conjointly, a block diagram of a control embodying the invention and utilizing five accelerometers.
Figure 2B:
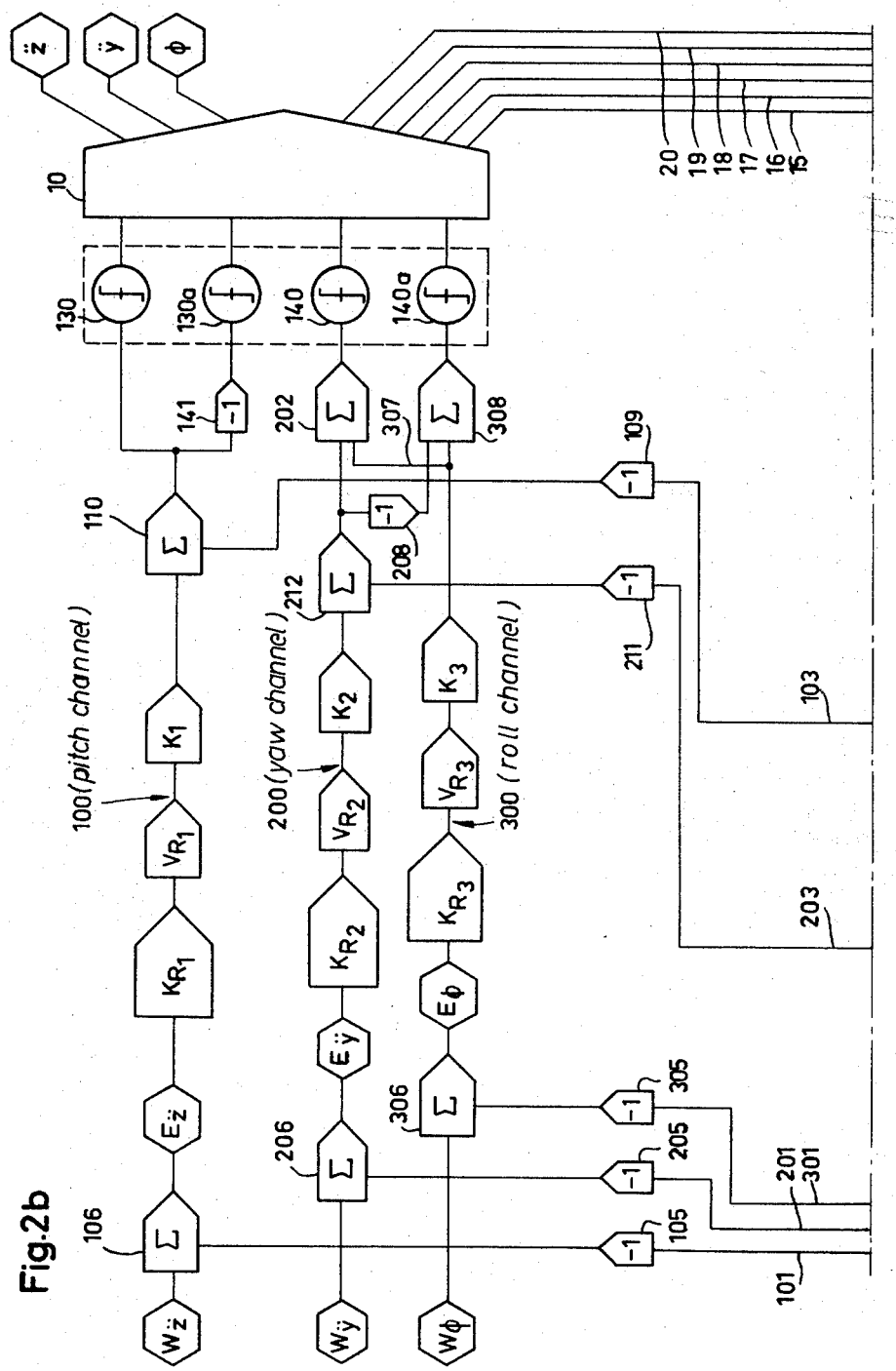

This control consists of three control loops, respectively, the so-called "pitch channel" 100 which controls the motions of the aerodynamic body about the pitch axis $A_1$, the so-called "yaw channel" 200 which controls the motions about the yaw axis $A_2$ and the so-called "roll-channel" 300 which controls the motions about the roll axis X, these channels being shown in FIGS. 2b and 3b. The lines of actions 15 through 20 indicate the connections of the accelerometers and the roll displacement gyroscope with the aerodynamic body 10, and the lines of action 101, 201, 301, 203 and 103 indicate the connections of the control loops in FIGS. 2a through 3b. For each control surface 13, 13a 14 and 14a, the aerodynamic body 10 has a actuator member 130, 130a, 140 and 140a, respectively schematically illustrated in FIGS. 2b and 3b.

The pitch channel 100 controls the actuator member 130 as well as the actuator member 130a; the yaw channel 200 controls the actuator member 140 as well as the actuator member 140a; the roll channel 300 controls the actuator member 140a as well as the actuator member 140.

The actuators are of the on–off type known per se, preferably electrohydraulic actuators such as shown, for example, in K R. Jackson, U.S. Pat. No. 2,655,940 or in FIG. 15.43 on page 15—38 of the mentioned "Control Engineers' Handbook". A network 20A serves for the processing of the signals, and the various mathematical operations depicted therein may be performed by the circuits shown in FIGS. 5.2a-—5.2h, on page 5—6 of the "Control Engineers' Handbook", as well as the circuits shown in FIG. 5.3 on page 5.7 of this publication, which further describes the operations of the various circuits for performing mathematical functions. Filters, adders and inverters, as well as transfer function performing means, are shown, along with network 20A, schematically in FIGS. 2a and 2b. These various components, namely, the filters, adders, and inverters are old and well known to those skilled in the art, and some of the circuits are shown on page 5—6, in FIG. 5.2, of "Control Engineers' Handbook".

For an understanding of the operation of the invention, the structure and operation of the control about the pitch axis 100 only will now be described with reference to the block diagram shown in FIGS. 2a and 2b. For this purpose, only the accelerometers $K_{M4}$, $K_{M6}$ and $K_{M7}$, shown in FIG. 1, will be considered. The respective output values $M_4$, $M_6$ and $M_7$ are transformed in network 20A, which serves for signal processing, into the control quantities $\dot{\omega}_y$ and $\ddot{z}$ according to the following equations:

$$\frac{1}{l_1+l_2}(M_6 - M_7) \quad (6)$$

$$\frac{l_1-l_2}{2(l_1+l^2)}M_6 - \frac{l_1}{l_1+l_2}M_7 + \frac{1}{2}M_4 \quad (7)$$

The control quantities $\dot{\omega}_y$ and $\ddot{z}$ are added, in an adder 104, to provide the feedback signal $P_1$, taking into consideration the system-based coefficients $b_1$ and $b0$. The signal $P_1$ is fed back through line 101 with polarity reversed in the inverter 105. In an adder 106, there is formed the error signal $E_i$ obtained from the command or reference value $W_z$ and the actual value, and the error signal is fed through a control $K_{R1}$, with an amplification of $V_{R1}$. After addition of the control signal $K_1$ in the adder 110, the signal is fed to the on-off actuators 130, which may be an electrohydraulic type actuator and after inversion of the sign in inverter 141, to the actuator 130a.

For further damping of the control loop, and for the correction of null errors of the accelerometers, the angular acceleration $\dot{\omega}y$ is also fed to an adder 108 through a filter $K_{H2}$ and with an amplification $V_{H2}$, and, with reverse polarity to the adder 108 through a filter $K_{H1}$ and an amplification $V_{H1}$. The sum signal from adder 108 is fed through line 103 to pitch channel 100 through adder 110, after a further reversal of polarity through an inverter 109. The feedback of the angular acceleration $\dot{\omega}_y$, as shown, can be simplified by choosing a combined transfer function instead of the three transfer functions $K_{H1}$, $K_{H2}$ and $b_1 \cdot K_{R1}$.

In addition to the signals from the accelerometers $K_{M6}$ and $K_{M4}$, as shown in FIG. 2a, the existing measuring data $M_3$ of the displacement gyroscope $K_{M3}$ are also used for roll displacement control. The angular displacement $\dot{\omega}_x$ about the roll axis is processed in the network 20A from the measurement data $M_4$ and $M_6$ as follows:

$$\dot{\omega}_x = \frac{1}{2r}(M_4 + M_6) \tag{8}$$

This angular acceleration about the roll axis X is added to the roll displacement angle $\Phi$ taking into consideration the coefficients $c_2$ and the filter $K_{H3}$ and the amplification factor $V_{H3}$, in an adder 302, to form the feedback signal $P_3$. This signal is applied to the roll channel 300, through the adder 306 and after polarity reversal in inverter 305. In adder 306, the signal is combined with the command reference value $W\Phi$ to provide the error signal $E\Phi$ which is fed through control $K_{R3}$ with an amplification $V_{R3}$ and, after addition of a coefficient $K_3$, to the actuators 140 and 140a associated with the roll channel 300. As will be noted from FIG. 2b, roll channel 300 is connected with yaw channel 200 through connection 307 and an adder 202, and thus to the actuator 140. Yaw channel 200 is similarly connected through an inverter 208 to the adder 308 in roll channel 300, and thus to actuator 140a.

The control signals $\dot{\omega}_z$ and $\ddot{y}$ are determined in network 20A from the accelerometer signals $M_1$, $M_2$, $M_4$ and $M_6$ in accordance with the following equations:

$$\dot{\omega}_z = \frac{1}{1+1_2}(M_1 - M_2) \tag{9}$$

$$\ddot{y} = \frac{1_2}{1_1+1_2}M_1 - \frac{1_1}{1_1+1_2}M_2 - \frac{1}{2}(M_4+M_6) \tag{10}$$

The control signals $\omega_z$ and $\ddot{y}$ are combined in an adder 204 after introducing system-based coefficients $a1$ and $a0$, to form the feedback signal $P_2$ which is fed to an adder 206 through a line or connection 201 and after polarity reversal in inverter 205. In adder 206, the polarity reversed feedback signal $P_2$ is combined with the command reference value $W\ddot{y}$ to form the error signal $E\ddot{y}$, which is fed to actuator 140 through control $K_{R2}$ with amplification factor $V_{R2}$ and with superimposition of the constant $K_2$.

As mentioned, yaw channel 200 is connected with roll channel 300 through inverter 208, so that actuators 140 and 140a which are associated with the yaw channel and the roll channel are supplied with combined signals formed from the error signals $E\Phi$ and $E\ddot{y}$ in the adders 202 and 308. The angular acceleration $\dot{\omega}_z$ is fed, for additional damping of the control loops and for the correction of null error of the accelerometers, directly through an adder 210 to control $K_{H1}$ with an amplification factor $V_{H1}$ and, with reverse polarity due to an inverter 209, to the adder 210 through a control $K_{H2}$ with an amplification factor $V_{H2}$. From adder 210, the angular acceleration $\dot{\omega}_z$ is fed through line 203 to adder 212 with polarity reversal in inverter 211 and thus to the yaw channel 200.

The complete system of the control of the lateral accelerations in the Z and Y directions, combined with a roll position control of the aerodynamic body 10, as shown in FIGS. 2a and 2b, thus comprises control loops designated as the pitch channel 100, yaw channel 200 and roll channel 300, to which are fed the command reference quantities $W\ddot{z}$, $W\ddot{y}$ and $W\Phi$ from the remote control device (not shown). The measurement data $M_7$, $M_6$, $M_2$, $M_1$ and $M_4$, respectively determined by the accelerometers $K_{M7}$, $K_{M6}$, $K_{M2}$, $K_{M1}$ and $K_{M4}$, from the instantaneous actual accelerations of the aerodynamic body, are transformed, after signal processing in the network 20A, into the control signals $\dot{\omega}_y$, $\ddot{z}$, $\dot{\omega}_z$, $\ddot{y}$ and $\dot{\omega}_x$.

They are added in the described manner, with the introduction of the factors $b0$, $b1$, $a1$, $a0$, $c_2$, $K_1$, $K_2$ and $K_3$, as well as of the roll position $\Phi$ as determined by the displacement gyroscope $K_{M3}$, to form feedback signals $P_1$, $P_2$ and $P_3$ and are fed back to the pitch, yaw and roll channels with reverse polarity due to inverters 105, 205 and 305. The error signals $E\ddot{z}$, $E\ddot{y}$ and $E\Phi$, formed in adders 106, 206 and 306 from the difference of the reference and actual values, are fed, through the associated controls, to on–off positioners with modification by the supplementary damping signals supplied through lines 103 and 203.

By means of rudders 13, 13a, 14 and 14a of the aerodynamic body 10, which are actuated by the actuators and are only illustrated schematically, there are built up the accelerations $\ddot{z}$ and $\ddot{y}$ which influence the flight attitude and trajectory, as well as the desired roll position $\Phi$, of the aerodynamic body 10.

The transfer functions of the controls and filters used in the embodiment of the apparatus shown in FIGS. 2a and 2b are $$K_{R1} = V_{R1}\frac{-1+T_{R11}s}{1+T_{R12}s}$$

$$K_{R2} = V_{R2}\frac{1+T_{R21}s}{1+T_{R22}s}$$

$$K_{R3} = V_{R3}\frac{1+T_{R31}s}{1+T_{R32}s}$$

$$K_{H1} = V_{H1}\frac{1}{1+T_{H1}s}$$

$$K_{H2} = V_{H2}\frac{1}{1+T_{H2}s}$$

$$K_{H3} = V_{H3}\frac{1+T_{\phi1}s}{1+T_{\phi2}s}$$

In these equations, the amplification is designated V, the time constant T and the Laplace operator s.

The numerical values associated with the factors $a_0$, $a_1$, $b_0$, $b_1$, $c_2$, $K_1$, $K_2$ and $K_3$, the installation constants $1_1$, $1_2$ and $r$ of the data transmitters, and the amplification factors $V_{R1}$ to $V_{R3}$ and $V_{H1}$ to $V_{H3}$, are:

$T_{R11} = T_{R21} = T_{R31} = 0.1$ (sec.)
$T_{R12} = T_{R22} = T_{R32} = 0.01$ (sec.)
$V_{R1} = V_{R2} = V_{R3} = 1$ (1)
$V_{H1} = 0.1$ $(m)$
$V_{H2} = 0.114 - 0.1154$ $(m)$
$V_{H3} = 1$
$T_{\phi1} = 0.05$ (sec.)
$T_{\phi2} = 0.005$ (sec.)
$a_0 = 5.10^{-3}$ (1)
$a_1 = 0.0175$ $(m)$
$b_0 = 5.10^{-3}$ (1)
$b_1 = 0.0175$ $(m)$
$c_2 = 6.10^{-4}$ (rad $s^2$)
$K_1 = 1$ (1)
$K_2 = 1$ (1)
$K_3 = 0.5$ (1)
$1_1 = 0.7$ $(m)$
$1_2 = 0.65$ $(m)$
$r = 0.06$ $(m)$ The modified control system shown in FIGS. 3a and 3b differs from that shown in FIGS. 2a and 2b in that it uses only three accelerometers which are arranged in the plane $E_1$ at the predetermined distance $l_1$ from the center of gravity S of the aerodynamic body 10, as shown in FIG. 1. The three accelerometers are the accelerometers $K_{M1}$, $K_{M4}$ and $K_{M6}$, which are arranged on mutually perpendicular axes Y and Z included in the planes of the rudder surfaces 14, 14a and 13, 13a of the aerodynamic body. At the intersection of these axes, there is arranged the displacement gyroscope $K_{M3}$ which stabilizes the roll position.

Parts identical with those shown in FIGS. 2a and 2b have been given the same reference symbols in FIGS. 3a and 3b. such as the pitch channel 100, yaw channel 200 and roll channel 300. The signals $M_1$, $M_4$ and $M_6$. determined by the accelerometers $K_{M1}$, $K_{M4}$ and $K_{M6}$ connected through the action lines 18, 19 and 16, are fed to the signal processing network 20B.

According to the following equations:

$$\ddot{z} - l_1 \dot{\omega}_y = \frac{1}{2}(M_4 - M_6) \tag{11}$$

and $$\ddot{y} + l_1 \dot{\omega}_z = M_1 - \frac{1}{2}(M_4 + M_6) \tag{12}$$

the control signals $\ddot{z} - l_1 \dot{\omega}_y$ and $\ddot{y} + l_1 \dot{\omega}_z$ are determined. Thus, the arrangement of FIGS. 3a and 3b uses a combination of rotational and lateral accelerations as control signals, rather than the actual rotational and lateral accelerations.

Assuming angular velocities about the X axis of FIG. 1, the following relations apply for the feedback signals $P_1$ and $P_2$:

$$P_1 = (\ddot{z} - l_1 \dot{\omega}_y) K_{H6} \tag{13}$$

$$P_2 = (\ddot{y} + l_1 \dot{\omega}_z) K_{H7} \tag{14}$$

The transfer function of the proper filter is to be substituted for $K_{H6}$ and $K_{H7}$.

Furthermore, in the network 20B, the control signal $\dot{\omega}_x$ is determined as follows:

$$\dot{\omega}_x = \frac{1}{2r}(M_4 + M_6) \tag{15}$$

This control signal, with the interposition of the coefficient $c_2$, is supplied to an adder 302, and the roll position $\Phi$ is supplied to adder 302 through filter $K_{H3}$ with an amplification factor $V_{H3}$. In the adder 302, the two signals form the feedback signal $P_3$.

The feedback signals $P_1$, $P_2$ and $P_3$ are fed, through lines 101, 201, and 301, respectively, and with polarity reversal in inverters 105, 205 and 305, respectively, to adders 106, 206 and 306, respectively. In the adders they are combined with respective reference values $W_{\ddot{z}}$, $W_{\ddot{y}}$ and $W\Phi$ to form the respective error signals $E_{\ddot{z}}$, $E_{\ddot{y}}$ and $E\Phi$. Error signal $E_{\ddot{z}}$ is fed through control $K_{R1}$ with amplification factor $V_{R1}$ to adder 110, error signal $E_{\ddot{y}}$ is fed through control $K_{R2}$ with amplification factor $V_{R2}$ to adder 212, and error signal $E\Phi$ is fed through control $K_{R3}$ with amplification factor $V_{R3}$ to adder 343.

For additional damping, the error signal $E_{\ddot{z}}$ is combined, in adder 110, with control signal $\ddot{z} - l_1 \dot{\omega}_y$ which is fed to adder 110 through filer $K_{H4}$ with amplification factor $V_{H4}$ and with polarity reversal in inverter 109, and error signal $E_{\ddot{y}}$ is combined, in adder 212, with control signal $\ddot{y} + l_1 \dot{\omega}_z$ which is fed to adder 212 through filer $K_{H5}$ with amplification factor $V_{H5}$ and with polarity reversal in inverter 211. The output of adder 110 is connected through control $K_{R4}$ with amplification factor $V_{R4}$ to actuator 130a and, through an inverter 141, to actuator 130. The output of adder 212 is fed through a control $K_{R5}$ with amplification factor $V_{R5}$ and, with polarity reversal in inverter 241 to adder 240 connected to actuator 140.

Roll channel 300 corresponds exactly to the roll channel described for the embodiment of the invention shown in FIGS. 2a and 2b and is connected to yaw channel 200 through line 340 and adder 240. The yaw channel 200 is connected with roll channel 300 through line 242 and adder 343. Inverter 241 is positioned ahead of adder 240 for correction of polarity.

The embodiment of the control system shown in FIGS. 3a and 3b exhibits the behavior described for the embodiment shown in FIGS. 2a and 2b. It is common to both systems that a resonance of rather high frequency, approximately between 20 and 30 $H_z$, occurs. This resonance acts on undesired side effects of threshold, backlash and friction like a dither signal, so that these side effects are reduced without the necessity of generation of a dither signal. As is well known, a dither signal is understood to be an a.c. signal whose frequency is high compared to the highest frequency occurring in the useful signal, and which is superposed on the useful signal to compensate for the mentioned nonlinearities.

The system-based coefficients of FIGS. 3a and 3b, namely $a_0$, $a_1$, $b_0$, $b_1$, $c_2$, $K_1$, $K_2$, $K_3$, $V_{R1}$, $V_{R2}$, $V_{R3}$, $V_{H1}$, $V_{H2}$ and $V_{H3}$ are so chosen that the influence of the null errors of the accelerometers are minimized. This is effected in that the numerical values of certain system parameters, for instance $V_{H1}$ and $V_{H2}$, are so chosen that the error term calculated for the steady-state condition of the system which has, in the case of the pitch channel (FIGS. 2a and 2b), after the adder 212 and under the influence of the null errors $\Delta_{M6}$, $\Delta_{M7}$ and $\Delta_{M4}$ of the accelerometers $K_{M6}$, $K_{M7}$ and $K_{M4}$, the form $$E = \Delta M_6 \epsilon_1 + \Delta M_7 \epsilon_2 + \Delta M_4 \epsilon_3 \tag{16}$$

where $E_1$, $E_2$ and $E_3$ are functions of the system coefficients $b_0$, $b_1$, $V_{R1}$, $V_{H1}$, $V_{H2}$, $l_1$, $l_2$ or $r$, or at least depend on some of these parameters, is minimized by the condition $$\epsilon_1^2 + \epsilon_2^2 + \epsilon_3^2 = \text{Min} \tag{17}$$

For instance, this minimizing may be effected according to the following equations:

$$\frac{\delta}{\delta V_{H1}}(\epsilon_1^2 + \epsilon_2^2 + \epsilon_3^2) = 0 \tag{18}$$

$$\frac{\delta}{\delta V_{H2}}(\epsilon_1^2 + \epsilon_2^2 + \epsilon_3^2) = 0 \tag{19}$$

where, for example $\frac{\delta}{\delta V_{H1}}$ represents the partial derivative of the minimum condition with respect to the system parameter $V_{H1}$.

We claim:

1. A method for control of the lateral acceleration of a remotely controlled dirigible aerodynamic body controlled, with respect to motion about at least one of the pitch and yaw axes, by control loops, said body being dirigible by crossed rudder surfaces controlled, as to acceleration, by on-off type actuator elements, and having its roll axis stabilized by a displacement gyroscope: said method comprising using solely and exclusively accelerometers on said body to measure accelerations about at least one of said pitch and yaw axes; supplying, to said control loops, control signals derived only from said accelerometers and corresponding to said measured accelerations; said method further including the step of using five accelerometers, having respective outputs $M_1$, $M_2$, $M_4$, $M_6$ and $M_7$, in two transverse planes of the body located at predetermined distances $l_1$ and $l_2$ from the center of gravity of the body; transforming the output signals in a network into control quantities $\dot{\omega}_y$, $\ddot{z}$, $\dot{\omega}_z$, $\ddot{y}$ and $\dot{\omega}_x$ according to the equations $$\dot{\omega}_y = \frac{1}{l_1 + l_2}(M_6 - M_7)$$

$$\ddot{z} = \frac{l_1 - l_2}{2(l_1 + l_2)} M_6 - \frac{l_1}{l_1 + l_2} M_7 + \frac{1}{2} M_4$$

$$\dot{\omega}_z = \frac{1}{l_1 + l_2}(M_1 - M_2)$$

$$\ddot{y} = \frac{l_2}{l_1 + l_2} M_1 - \frac{l_1}{l_1 + l_2} M_2 - \frac{1}{2}(M_4 + M_6)$$

$$\dot{\omega}_x = \frac{1}{2r}(M_4 + M_6)$$

; adding the control quantities, and the roll position, taking into consideration system-based coefficients to form feedback signals; reversing the polarity of the feedback signals; comparing the feedback signals with respective reference values to provide respective error signals; controlling said actuating elements in response to the respective error signals; effecting additional damping of the control loops and correction of the null errors of the accelerometers by feeding the angular acceleration $\dot{\omega}_y$ and its inverted value through filters, combining the angular acceleration $\dot{\omega}_y$ and its inverted value, reversing the polarity of the combined value and feeding it to the control loop for the pitch axis, and feeding the angular velocity $\dot{\omega}_z$ and its inverted value through filters and adding the angular velocity $\dot{\omega}_z$ and its inverted value, inverting the combined value and feeding the inverted combined value to the control loop for the yaw axis; and interconnecting and superposing the signals applied to the inputs of the actuating elements responding to roll and pitch commands.

2. A method, as claimed in claim 1, including the step of minimizing the influence of the null errors of the accelerometers by selecting the system-based coefficients, corresponding to the condition $\epsilon_1^2+\epsilon_2^2+\epsilon_3^2$ = minimum, according to the equation $$\frac{\delta}{\delta V_{H1}} (\epsilon_1^2+\epsilon_2^2+\epsilon_3^2)=0$$

$$\frac{\delta}{\delta V_{H2}} (\epsilon_1^2+\epsilon_2^2+\epsilon_3^2)=0$$

; wherein $\epsilon_1$, $\epsilon_2$, and $\epsilon_3$ represent functions of the system-based coefficients and the partial derivative of the minimum condition with respect to a system parameter, with $V_{H1}$ and $V_{H2}$ being system parameters.

3. A method for control of the lateral acceleration of a remotely controlled dirigible aerodynamic body controlled, with respect to motion about at least one of the pitch and yaw axes, by control loops, said body being dirigible by crossed rudder surfaces controlled, as to acceleration, by on–off type actuator elements, and having its roll axis stabilized by a displacement gyroscope; said method comprising using, solely and exclusively, accelerometers on said body to measure accelerations about at least one of said pitch and yaw axes; supplying, to said control loops, control signals derived only from accelerometers and corresponding to said measured accelerations; said method including the step of using three accelerometers in a transverse plane at a predetermined distance $l_1$ from the center of gravity of said body, said displacement gyroscope being arranged in said plane; transforming the output signals $M_4$, $M_6$ and $M_1$ of said accelerometers into the control quantities $\ddot{z}-l_1\dot{\omega}_y$, $\ddot{y}+l_1\dot{\omega}_z$ and $\dot{\omega}_x$ in accordance with the equations $$\ddot{z}-l_1\dot{\omega}_y=\frac{1}{2}(M_4-M_6)$$

$$\ddot{y}+l_1\dot{\omega}_z=M_1-\frac{1}{2}(M_4+M_6)$$

$$\dot{\omega}_x=\frac{1}{2r}(M_4+M_6)$$

combining the first two control quantities with system-based coefficients to form respective feedback signals $P_1$ and $P_2$, combining the third control quantity with the roll position and with interposition of system-based coefficients to form a feedback signal $P_3$; comparing each feedback signal, after polarity reversal thereof, with a respective control reference value to form a respective error signal; utilizing said error signals to control operation of said actuator elements in a corrective direction; for additional damping of the control loops and correction of the null errors of the accelerometers, feeding said first and second mentioned control quantities, after polarity inversion thereof, to the pitch channel and yaw channel, respectively; and interconnecting and superposing the signals acting on the actuator elements responding to the roll and pitch commands.

4. Apparatus for control of the lateral acceleration of a remotely controlled dirigible aerodynamic body having crossed steering rudders substantially perpendicular to each other and having means stabilizing its roll axis, the body having pitch and yaw axes which are perpendicular to each other and to the roll axis and being controlled, as to movement about its axes, by control loops; said apparatus comprising, in combination, on–off type actuator elements connected to said rudders and operable to operate said rudders responsive to signal inputs to said actuator elements from said control loops; a plurality of accelerometers arranged in at least one transverse plane of said body at a predetermined longitudinal distance from the center of gravity of said body, said accelerometers being arranged on mutually perpendicular axes which are perpendicular to said roll axis and each of which mutually perpendicular axes is included in the plane of the surface of a respective rudder; said accelerometers constituting the sole means measuring accelerations about said pitch and yaw axes and providing output signals corresponding to the measured accelerations; and a signal processing network connected to the outputs of said accelerometers and to said control loops and supplying, to said control loops, control signals derived from said accelerometers and corresponding to said measured accelerations; said means stabilizing said roll axis comprising a displacement gyroscope having its input connected to the input of said network; said network combining output signals of said accelerometers with the output signal of said stabilizing gyroscope; there being five accelerometers positioned in two transverse planes, each plane being at a respective predetermined distance from the center of gravity of said body; said network combining the accelerometer output signals to obtain control quantities corresponding to the respective accelerations about said mutually perpendicular axes, to the respective accelerations along said mutually perpendicular axes and to the acceleration about said roll axis; said network including filters, adders and inverters effective to combine, with the introduction of system-based coefficients, the control quantity representing the acceleration about one of said mutually perpendicular axes with the control quantity representing the acceleration along the other of said mutually perpendicular axes to obtain a first feedback signal, the control quantity corresponding to the acceleration about said other of said mutually perpendicular axes with the control quantity corresponding to the acceleration along said one of said mutually perpendicular axes, to obtain a second feedback signal, and the control quantity corresponding to the acceleration about said roll axis with the output of said stabilizing gyroscope to obtain a third feedback signal; said network including further adders and inverters operable to compare each of said feedback signals with a respective control reference value to obtain a respective error signal and to apply said error signals to respective controls associated with each of said actuator elements.

5. Apparatus for control of the lateral acceleration of a remotely controlled dirigible aerodynamic body having crossed steering rudders substantially perpendicular to each other and having means stabilizing its roll axis, the body having pitch and yaw axes which are perpendicular to each other and to the roll axis and being controlled, as to movement about its axes, by control loops; said apparatus comprising, in combination, on–off type actuator elements connected to said rudders and operable to operate said rudders responsive to signal inputs to said actuator elements from said control loops; a plurality of accelerometers arranged in at least one transverse plane of said body at a predetermined longitudinal distance from the center of gravity of said body, said accelerometers being arranged on mutually perpendicular axes which are perpendicular to said roll axis and each of which mutually perpendicular axes is included in the plane of the surface of a respective rudder; said accelerometer measuring accelerations about said pitch and yaw axes and providing output signals corresponding to the measured accelerations; and a signal processing network connected to the outputs of said accelerometers and to said control loops and supplying, to said control loops, control signals derived from said accelerometers and corresponding to said measured accelerations; said means stabilizing said roll axis comprising a displacement gyroscope having its output connected to the input of said network; said network combining output signal of said stabilizing gyroscope; three accelerometers arranged in a single transverse plane; said network combining the outputs of said three accelerometers to provide a first control quantity corresponding to the acceleration along one of said mutually perpendicular axes less the acceleration about the other of said mutually perpendicular axes multiplied by said predetermined distance, a second control quantity corresponding to the acceleration along the other of said mutually perpendicular axes plus the acceleration about said one mutually perpendicular axes multiplied by said predetermined distance, and a third control quantity corresponding to the acceleration about said roll axis; said network further including filters, adders and inverters combining system-based coefficients with each of said control quantities to provide a first feedback signal corresponding to said first control quantity and a second feedback signal corresponding to said second control quantity, and combining said third control quantity with the output signal of said stabilizing gyroscope to provide a third feedback signal; said network including further adders comparing each of said feedback signals with respective control reference values to provide a respective error signal, and applying each of said error signals to a respective control associated with a respective actuator element.